(12) United States Patent
Pugh et al.

(10) Patent No.: US 7,931,832 B2
(45) Date of Patent: *Apr. 26, 2011

(54) OPHTHALMIC LENS MEDIA INSERT

(75) Inventors: Randall B. Pugh, Jacksonville, FL (US); Daniel B. Otts, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/405,586

(22) Filed: Mar. 17, 2009

(65) Prior Publication Data
US 2009/0244477 A1   Oct. 1, 2009

Related U.S. Application Data

(60) Provisional application No. 61/040,772, filed on Mar. 31, 2008.

(51) Int. Cl.
*G02B 3/00* (2006.01)

(52) U.S. Cl. .......... 264/1.32; 264/1.36; 264/1.7
(58) Field of Classification Search .......... 264/1.32, 264/1.36, 1.7
See application file for complete search history.

(56) References Cited

U.S. PATENT DOCUMENTS

| 5,682,210 A | 10/1997 | Weirich |
| 2006/0267768 A1 | 11/2006 | Sabeta |

FOREIGN PATENT DOCUMENTS

| EP | 1262307 A2 | 12/2002 |
| WO | WO 2007133197 A1 | 11/2007 |

OTHER PUBLICATIONS

PCT International Search Report, dated Aug. 10, 2009, for PCT Int'l Appln. No. PCT/US2009/038828.

*Primary Examiner* — Christina Johnson
*Assistant Examiner* — Saeed M Huda
(74) *Attorney, Agent, or Firm* — Joseph Kincart

(57) ABSTRACT

This invention discloses methods and apparatus for providing an ophthalmic lens with media including an energy receptor. In some embodiments, the media includes an insert placed in a cavity formed to cast mold an ophthalmic lens from a reactive mixture.

11 Claims, 6 Drawing Sheets

WIRELESSLY TRANSFER ENERGY TO AN ENERGY RECEPTOR PROVIDED TO A MEDIA INCORPORATED INTO AN OPHTHALMIC LENS
501

RECEIVE ENERGY INTO THE ENERGY RECEPTOR INCORPORATED INTO THE OPHTHALMIC LENS
502

DIRECT THE RECEIVED ENERGY TO AN INFORMATION PROCESSING COMPONENT
503

PERFORM AN ACTION RELATING TO THE INFORMATION
504

TRANSMIT INFORMATION BASED UPON THE ACTION PERFORMED
505

FIG. 5

OPHTHALMIC LENS MEDIA INSERT

RELATED APPLICATIONS

This application is a non-provisional filing of a provisional application, U.S. Ser. No. 61/040,772, filed on Mar. 31, 2008.

FIELD OF USE

This invention describes methods and apparatus for the fabrication of an energized ophthalmic lens and more specifically of an ophthalmic lens with a media insert including an energy source.

BACKGROUND

Traditionally an ophthalmic device, such as a contact lens, an intraocular lens or a punctal plug included a biocompatible device with a corrective, cosmetic or therapeutic quality. A contact lens, for example, can provide one or more of: vision correcting functionality; cosmetic enhancement; and therapeutic effects. Each function is provided by a physical characteristic of the lens. A design incorporating a refractive quality into a lens can provide a vision corrective function. A pigment incorporated into the lens can provide a cosmetic enhancement. An active agent incorporated into a lens can provide a therapeutic functionality. Such physical characteristics are accomplished without the lens entering into an energized state.

More recently, it has been theorized that active components may be incorporated into a contact lens. Some components can include semiconductor devices. Some examples have shown semiconductor devices embedded in a contact lens placed upon animal eyes. However, such devices lack a free standing energizing mechanism. Although wires may be run from a lens to a battery to power such semiconductor devices, and it has been theorized that the devices may be wirelessly powered, no mechanism for such wireless power has been available.

It is desirable therefore to have additional methods and apparatus conducive to the formation of ophthalmic lenses that are wirelessly energized to an extent suitable for powering a semiconductor device incorporated into a biomedical device, such as an ophthalmic lens.

SUMMARY

Accordingly, the present invention includes methods and apparatus for forming an ophthalmic lens, with an energized portion capable of powering an active component. In some embodiments, the ophthalmic lens will include a cast molded silicone hydrogel with a media insert including energy receptor capable of wirelessly receiving energy and powering an electronic component. The energized portion can be created, for example via a jetting process or a pad printing process or automated placement wherein a conductive material is placed on a media incorporated into the lens.

Additional embodiments include methods of forming an ophthalmic lens which include the steps of depositing a media including an energy receptor into a mold part for fashioning an ophthalmic lens.

The energy receptor can be deposited onto the media via ink jet, pad print, or mechanical placement. A reactive monomer mix is placed into one of: the first mold part and the second mold part. The first mold part is positioned proximate to the second mold part thereby forming a lens cavity with the media including the energy receptor and at least some of the reactive monomer mix in the lens cavity; and exposing the reactive monomer mix to actinic radiation.

Lenses are formed via the control of actinic radiation to which the reactive monomer mixture is exposed.

DESCRIPTION OF THE DRAWINGS

FIG. 5 illustrates method steps according to some additional aspect of the present invention.

DETAILED DESCRIPTION OF THE INVENTION

Figure 1:
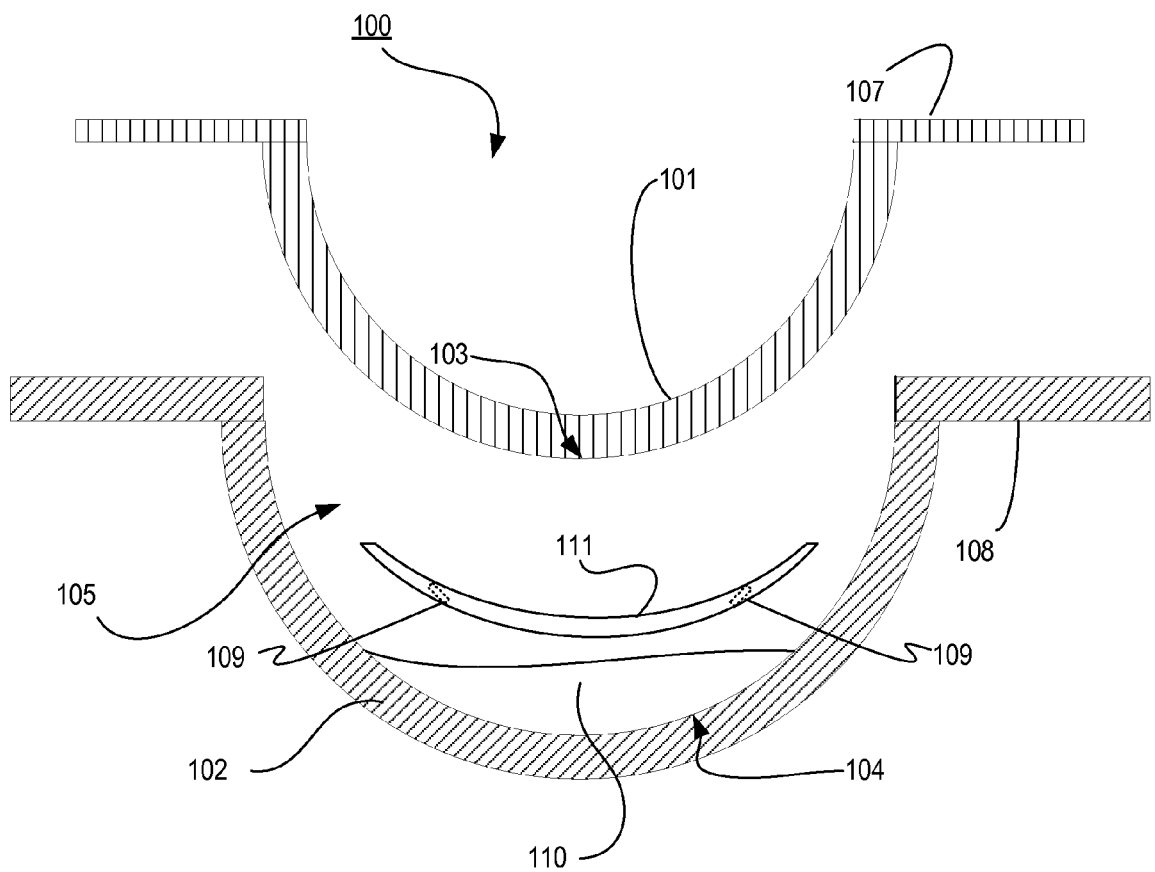
FIG. 1 illustrates a mold assembly apparatus and media according to some embodiments of the present invention.

The present invention includes ophthalmic lenses and methods of making the ophthalmic lenses. In particular, the present invention includes an ophthalmic lens with a wireless energy receptor and information processing component imparted to a lens or lens mold part via media insert. In some embodiments, the present invention includes a hydrogel contact lens including a media comprising a generally annular energy receptor around a periphery of an optic zone in the contact lens. Additional embodiments can include an energy receptor portion that includes a coil or other pattern of conductive material incorporated into a media included in an ophthalmic lens. The pattern can be based upon a tuned wavelength of energy which can be wirelessly transmitted to the lens.

In some embodiments, a pattern of conductive material can be located exterior to an optic zone through which a wearer of a lens would see, while other embodiments can include a pattern of conductive material which is small enough to not adversely affect the sight of a contact lens wearer and therefore can be located within, or exterior to, an optical zone.

In general, according to some embodiments of the present invention, a media insert including an energy receptor is embodied within an ophthalmic lens. In some embodiments, the energy receptor can be deposited onto the media via a jet printing process which places the receptor material in a desired location. The media insert is mechanically placed in position relative to a mold part used to fashion the lens. In some embodiments, a component is placed in electrical communication with the receptor material included on the media such that the receptor material can provide electrical power to power the component. Subsequent to placement of the media insert a Reactive Mixture can be shaped by respective mold parts and polymerized to form the ophthalmic lens.

DEFINITIONS

As used herein, "energy receptor" refers to a medium that functions as an antenna for receiving wireless energy, such as, for example via radio wave transmission.

As used herein, "energy reception portion" refers to a portion of a biomedical device, such as an ophthalmic lens, which is functional as an energy receptor.

As referred to herein, "ink jet", refers an apparatus for propelling droplets of liquid or molten material onto a media. Ink jet apparatus can include, by way of non-limiting example, one or more of: piezo electric ink jet apparatus; thermal ink jet and continuous inkjet apparatus.

As referred to herein, the term "ink jetting" or "jetting" refers to an action resulting in the propulsion of droplets or molten material onto a media.

As used herein "lens" refers to any ophthalmic device that resides in or on the eye. These devices can provide optical correction or may be cosmetic. For example, the term lens can refer to a contact lens, intraocular lens, overlay lens, ocular insert, optical insert or other similar device through which vision is corrected or modified, or through which eye physiology is cosmetically enhanced (e.g. iris color) without impeding vision. In some embodiments, the preferred lenses of the invention are soft contact lenses are made from silicone elastomers or hydrogels, which include but are not limited to silicone hydrogels, and fluorohydrogels.

As used herein, the term "lens forming mixture" or "Reactive Mixture" or "RMM" (reactive monomer mixture) refers to a monomer or prepolymer material which can be cured and crosslinked or crosslinked to form an ophthalmic lens. Various embodiments can include lens forming mixtures with one or more additives such as: UV blockers, tints, photoinitiators or catalysts, and other additives one might desire in an ophthalmic lenses such as, contact or intraocular lenses.

As used herein "lens forming surface" means a surface that is used to mold a lens. In some embodiments, any such surface 103-104 can have an optical quality surface finish, which indicates that it is sufficiently smooth and formed so that a lens surface fashioned by the polymerization of a lens forming material in contact with the molding surface is optically acceptable. Further, in some embodiments, the lens forming surface 103-104 can have a geometry that is necessary to impart to the lens surface the desired optical characteristics, including without limitation, spherical, aspherical and cylinder power, wave front aberration correction, corneal topography correction and the like as well as any combinations thereof.

As used herein, the term "media insert" refers to a rigid, semi rigid or flexible platform for supporting an energy receptor.

As used herein, the term "mold" refers to a rigid or semi-rigid object that may be used to form lenses from uncured formulations. Some preferred molds include two mold parts forming a front curve mold part and a back curve mold part.

As used herein, "optical zone" means that area of an ophthalmic lens through which a wearer of the ophthalmic lens sees.

As used herein, "released from a mold," means that a lens is either completely separated from the mold, or is only loosely attached so that it can be removed with mild agitation or pushed off with a swab.

Molds

Referring now to FIG. 1, a diagram of an exemplary mold 100 for an ophthalmic lens is illustrated with an energy receiving portion 109. As used herein, the terms a mold includes a form 100 having a cavity 105 into which a lens forming mixture 110 can be dispensed such that upon reaction or cure of the lens forming mixture, an ophthalmic lens of a desired shape is produced. The molds and mold assemblies 100 of this invention are made up of more than one "mold parts" or "mold pieces" 101-102. The mold parts 101-102 can be brought together such that a cavity 105 is formed between the mold parts 101-102 in which a lens can be formed. This combination of mold parts 101-102 is preferably temporary.

Upon formation of the lens, the mold parts 101-102 can again be separated for removal of the lens.

At least one mold part 101-102 has at least a portion of its surface 103-104 in contact with the lens forming mixture such that upon reaction or cure of the lens forming mixture 110 that surface 103-104 provides a desired shape and form to the portion of the lens with which it is in contact. The same is true of at least one other mold part 101-102.

Thus, for example, in a preferred embodiment a mold assembly 100 is formed from two parts 101-102, a female concave piece (front piece) 102 and a male convex piece (back piece) 101 with a cavity formed between them. The portion of the concave surface 104 which makes contact with lens forming mixture has the curvature of the front curve of an ophthalmic lens to be produced in the mold assembly 100 and is sufficiently smooth and formed such that the surface of an ophthalmic lens formed by polymerization of the lens forming mixture which is in contact with the concave surface 104 is optically acceptable.

In some embodiments, the front mold piece 102 can also have an annular flange integral with and surrounding circular circumferential edge 108 and extends from it in a plane normal to the axis and extending from the flange (not shown).

A lens forming surface can include a surface 103-104 with an optical quality surface finish, which indicates that it is sufficiently smooth and formed so that a lens surface fashioned by the polymerization of a lens forming material in contact with the molding surface is optically acceptable. Further, in some embodiments, the lens forming surface 103-104 can have a geometry that is necessary to impart to the lens surface the desired optical characteristics, including without limitation, spherical, aspherical and cylinder power, wave front aberration correction, corneal topography correction and the like as well as any combinations thereof.

At 111, a media is illustrated onto which an energy receptor may be placed, such as, for example, via ink jet or pad printing. The media 111 may be any receiving material onto which supports the conductive material. In some embodiments, the media 111 can be a clear coat of a material which can be incorporated into a lens when the lens is formed. The clear coat can include for example a pigment as described below, a monomer or other biocompatible material. Additional embodiments can include a media comprising an insert, which can be either rigid or formable. In some embodiments, a rigid insert may include an optical zone providing an optical property (such as those utilized for vision correction) and a non-optical zone portion. An energy receptor can be deposited on one or both of the optic zone and non-optic zone of the insert.

Rigid inserts can include any material compatible with the lens material and in various embodiments, may include opaque or non-opaque materials.

Various embodiments also include ink jetting an energy receptor onto an insert prior to placement of the insert into a mold portion used to form a lens. An insert, or other media 111, may also include one or more components which will receive an electrical charge via the energy receptor 109.

Mold part 101-102 material can include a polyolefin of one or more of: polypropylene, polystyrene, polyethylene, polymethyl methacrylate, and modified polyolefins.

A preferred alicyclic co-polymer contains two different alicyclic polymers and is sold by Zeon Chemicals L.P. under the trade name ZEONOR. There are several different grades of ZEONOR. Various grades may have glass transition temperatures ranging from 105° C. to 160° C. A specifically preferred material is ZEONOR 1060R.

Other mold materials that may be combined with one or more additives to form an ophthalmic lens mold include, for example, Zieglar-Natta polypropylene resins (sometimes referred to as znPP). On exemplary Zieglar-Natta polypropylene resin is available under the name PP 9544 MED. PP 9544 MED is a clarified random copolymer for clean molding as per FDA regulation 21 CFR (c)3.2 made available by Exxon-Mobile Chemical Company. PP 9544 MED is a random copolymer (znPP) with ethylene group (hereinafter 9544 MED). Other exemplary Zieglar-Natta polypropylene resins include: Atofina Polypropylene 3761 and Atofina Polypropylene 3620WZ.

Still further, in some embodiments, the molds of the invention may contain polymers such as polypropylene, polyethylene, polystyrene, polymethyl methacrylate, modified polyolefins containing an alicyclic moiety in the main chain and cyclic polyolefins. This blend can be used on either or both mold halves, where it is preferred that this blend is used on the back curve and the front curve consists of the alicyclic copolymers.

In some preferred methods of making molds 100 according to the present invention, injection molding is utilized according to known techniques, however, embodiments can also include molds fashioned by other techniques including, for example: lathing, diamond turning, or laser cutting.

Typically, lenses are formed on at least one surface of both mold parts 101-102. However, in some embodiments, one surface of a lens may be formed from a mold part 101-102 and another surface of a lens can be formed using a lathing method, or other methods.

Lenses

Figure 2A:
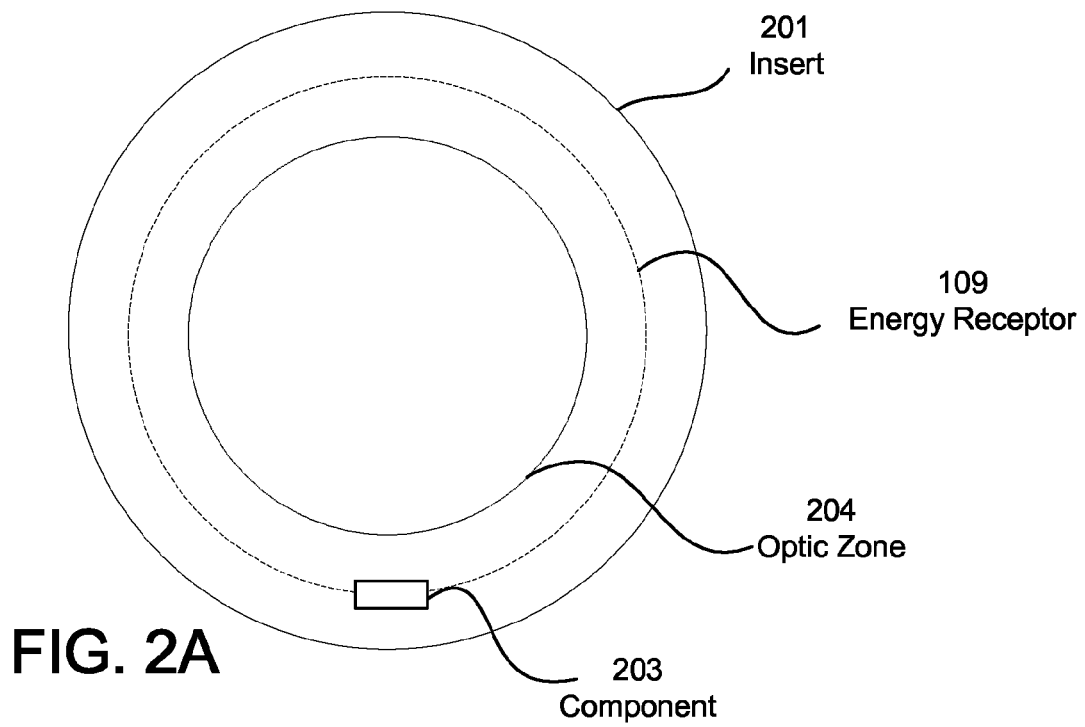
FIG. 2A illustrates a top down view of an ophthalmic lens with a media including a component and energy receptor.

Referring now to FIG. 2A, an ophthalmic lens 201 is illustrated with an energy receptor 109 and a component 203. As illustrated, the energy receptor 109 can include a conductive material, such as, for example, carbon fibers; carbon nanostructures, including carbon nano tubes; and a metallic material. Suitable metallic materials can include, for example, gold, silver and copper. Carbon nanostructures can include single walled carbon nanotubes or multiple walled carbon nanotubes.

The energy receptor 109 can be in electrical communication with a component 203. The component 203 can include any device which responds to an electrical charge with a change in state, such as, for example: a semiconductor type chip; a passive electrical device; or an optical device such as a crystal lens. In some specific embodiments, the component 203 includes an electrical storage device, such as, for example, a capacitor; ultracapacitor; supercapacitor; a battery or other storage component. An electrical storage component 203 can include, for example: a lithium ion battery located in the periphery of an ophthalmic lens outside of the optic zone and be chargeable via one or more of radio frequency and magnetic inductance into an energy receptor deposited via ink jetting. Other electrical storage device components may also receive an electrical charge via the energy receptor 109.

Other exemplary embodiments can include a component comprising a radio frequency identification chip ("RFID chip") chip. The component 203 may also include multiple devices or circuitry. In an effort to provide simplicity in this description, the one or more devices will generally be referred to in the singular, as a component 203.

Figure 2B:
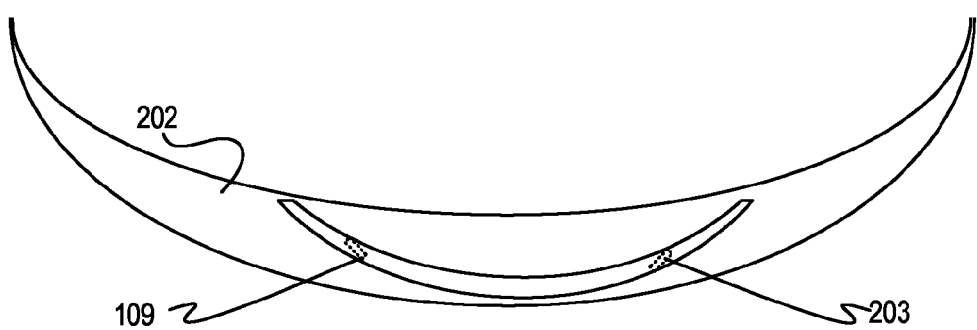
FIG. 2B illustrates a side view of an ophthalmic lens with a media including a component and energy receptor.

FIG. 2B further illustrates that an energy receptor 109 can be placed; ink jetted or pad printed in a pattern 109A onto the media 111. A pattern 109A can be used to increase the electrical length of an energy receptor present in the lens. In addition, a pattern 109A can be tuned to a wireless wavelength to facilitate or control efficient wireless transfer of energy.

As illustrated, in some embodiments, the energy receptor portion 109 and the component 203 is located outside of an optic zone 202, wherein the optic zone 202 includes that portion of the lens 201 providing line of sight for a wearer of the lens 201. Other embodiments may include an energy receptor 109 in the optic zone portion of an ophthalmic lens. For example, such embodiments can include a receptor portion 109 of conductive particles too small to be viewable without aid to the human eye.

In some embodiments, a preferred lens type can include a lens 201 that includes a silicone containing component. A "silicone-containing component" is one that contains at least one [—Si—O—] unit in a monomer, macromer or prepolymer. Preferably, the total Si and attached O are present in the silicone-containing component in an amount greater than about 20 weight percent, and more preferably greater than 30 weight percent of the total molecular weight of the silicone-containing component. Useful silicone-containing components preferably comprise polymerizable functional groups such as acrylate, methacrylate, acrylamide, methacrylamide, vinyl, N-vinyl lactam, N-vinylamide, and styryl functional groups.

Suitable silicone containing components include compounds of Formula I

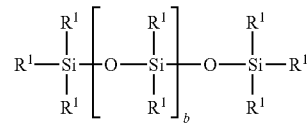

where $R^1$ is independently selected from monovalent reactive groups, monovalent alkyl groups, or monovalent aryl groups, any of the foregoing which may further comprise functionality selected from hydroxy, amino, oxa, carboxy, alkyl carboxy, alkoxy, amido, carbamate, carbonate, halogen or combinations thereof; and monovalent siloxane chains comprising 1-100 Si—O repeat units which may further comprise functionality selected from alkyl, hydroxy, amino, oxa, carboxy, alkyl carboxy, alkoxy, amido, carbamate, halogen or combinations thereof;

where b=0 to 500, where it is understood that when b is other than 0, b is a distribution having a mode equal to a stated value;

wherein at least one $R^1$ comprises a monovalent reactive group, and in some embodiments between one and 3 $R^1$ comprise monovalent reactive groups.

As used herein "monovalent reactive groups" are groups that can undergo free radical and/or cationic polymerization. Non-limiting examples of free radical reactive groups include (meth)acrylates, styryls, vinyls, vinyl ethers, $C_{1-6}$alkyl(meth)acrylates, (meth)acrylamides, $C_{1-6}$alkyl(meth)acrylamides, N-vinyllactams, N-vinylamides, $C_{2-12}$alkenyls, $C_{2-12}$alkenylphenyls, $C_{2-12}$alkenylnaphthyls, $C_{2-6}$alkenylphenyl$C_{1-6}$alkyls, O-vinylcarbamates and O-vinylcarbonates. Non-limiting examples of cationic reactive groups include vinyl ethers or epoxide groups and mixtures thereof. In one embodiment the free radical reactive groups comprises (meth)acrylate, acryloxy, (meth)acrylamide, and mixtures thereof.

Suitable monovalent alkyl and aryl groups include unsubstituted monovalent $C_1$ to $C_{16}$ alkyl groups, $C_6$-$C_{14}$ aryl groups, such as substituted and unsubstituted methyl, ethyl, propyl, butyl, 2-hydroxypropyl, propoxypropyl, polyethyleneoxypropyl, combinations thereof and the like.

In one embodiment b is zero, one $R^1$ is a monovalent reactive group, and at least 3 $R^1$ are selected from monovalent alkyl groups having one to 16 carbon atoms, and in another embodiment from monovalent alkyl groups having one to 6 carbon atoms. Non-limiting examples of silicone components of this embodiment include 2-methyl-, 2-hydroxy-3-[3-[1,3,3,3-tetramethyl-1-[(trimethylsilyl)oxy]disiloxanyl]propoxy]propyl ester ("SiGMA"), 2-hydroxy-3-methacryloxypropyloxypropyl-tris(trimethylsiloxy)silane, 3-methacryloxypropyltris(trimethylsiloxy)silane ("TRIS"), 3-methacryloxypropylbis(trimethylsiloxy)methylsilane and 3-methacryloxypropylpentamethyl disiloxane.

In another embodiment, b is 2 to 20, 3 to 15 or in some embodiments 3 to 10; at least one terminal $R^1$ comprises a monovalent reactive group and the remaining $R^1$ are selected from monovalent alkyl groups having 1 to 16 carbon atoms, and in another embodiment from monovalent alkyl groups having 1 to 6 carbon atoms. In yet another embodiment, b is 3 to 15, one terminal $R^1$ comprises a monovalent reactive group, the other terminal $R^1$ comprises a monovalent alkyl group having 1 to 6 carbon atoms and the remaining $R^1$ comprise monovalent alkyl group having 1 to 3 carbon atoms. Non-limiting examples of silicone components of this embodiment include (mono-(2-hydroxy-3-methacryloxypropyl)-propyl ether terminated polydimethylsiloxane (400-1000 MW)) ("OH-mPDMS"), monomethacryloxypropyl terminated mono-n-butyl terminated polydimethylsiloxanes (800-1000 MW), ("mPDMS").

In another embodiment b is 5 to 400 or from 10 to 300, both terminal $R^1$ comprise monovalent reactive groups and the remaining $R^1$ are independently selected from monovalent alkyl groups having 1 to 18 carbon atoms which may have ether linkages between carbon atoms and may further comprise halogen.

In one embodiment, where a silicone hydrogel lens is desired, the lens of the present invention will be made from a reactive mixture comprising at least about 20 and preferably between about 20 and 70% wt silicone containing components based on total weight of reactive monomer components from which the polymer is made.

In another embodiment, one to four $R^1$ comprises a vinyl carbonate or carbamate of the formula:

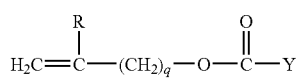

Formula II wherein: Y denotes O—, S— or NH—;
R denotes, hydrogen or methyl; d is 1, 2, 3 or 4; and q is 0 or 1.

The silicone-containing vinyl carbonate or vinyl carbamate monomers specifically include: 1,3-bis[4-(vinyloxycarbonyloxy)but-1-yl]tetramethyl-disiloxane; 3-(vinyloxycarbonylthio) propyl-[tris (trimethylsiloxy)silane]; 3-[tris (trimethylsiloxy)silyl]propyl allyl carbamate; 3-[tris (trimethylsiloxy)silyl]propyl vinyl carbamate; trimethylsilylethyl vinyl carbonate; trimethylsilylmethyl vinyl carbonate, and

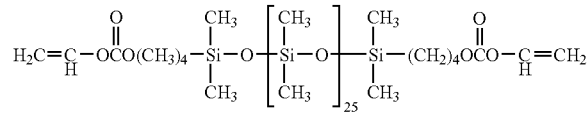

Where biomedical devices with modulus below about 200 are desired, only one $R^1$ shall comprise a monovalent reactive group and no more than two of the remaining $R^1$ groups will comprise monovalent siloxane groups.

Another class of silicone-containing components includes polyurethane macromers of the following formulae:

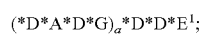

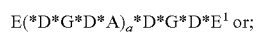

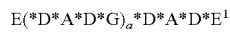     Formulae IV-IV wherein:

D denotes an alkyl diradical, an alkyl cycloalkyl diradical, a cycloalkyl diradical, an aryl diradical or an alkylaryl diradical having 6 to 30 carbon atoms, G denotes an alkyl diradical, a cycloalkyl diradical, an alkyl cycloalkyl diradical, an aryl diradical or an alkylaryl diradical having 1 to 40 carbon atoms and which may contain ether, thio or amine linkages in the main chain;

\* denotes a urethane or ureido linkage;

$a$ is at least 1;

A denotes a divalent polymeric radical of formula:

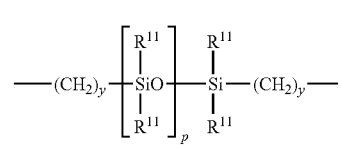

Formula VII $R^{11}$ independently denotes an alkyl or fluoro-substituted alkyl group having 1 to 10 carbon atoms which may contain ether linkages between carbon atoms; y is at least 1; and p provides a moiety weight of 400 to 10,000; each of E and $E^1$ independently denotes a polymerizable unsaturated organic radical represented by formula:

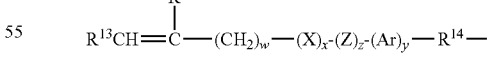

Formula VIII wherein: $R^{12}$ is hydrogen or methyl; $R^{13}$ is hydrogen, an alkyl radical having 1 to 6 carbon atoms, or a —CO—Y—$R^{15}$ radical wherein Y is —O—, Y—S— or —NH—; $R^{14}$ is a divalent radical having 1 to 12 carbon atoms; X denotes —CO— or —OCO—; Z denotes —O— or —NH—; Ar denotes an aromatic radical having 6 to 30 carbon atoms; w is 0 to 6; x is 0 or 1; y is 0 or 1; and z is 0 or 1.

A preferred silicone-containing component is a polyurethane macromer represented by the following formula:

Formula IX

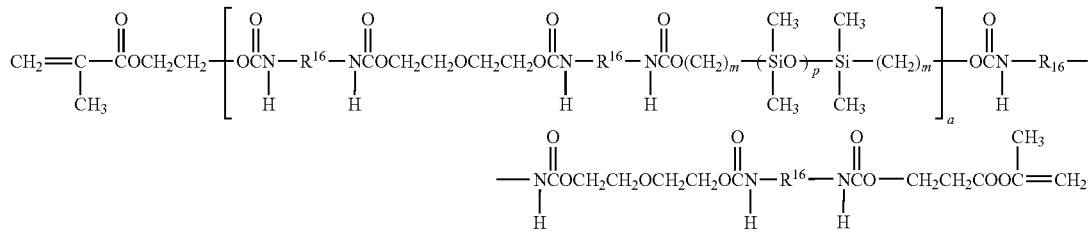

wherein $R^{16}$ is a diradical of a diisocyanate after removal of the isocyanate group, such as the diradical of isophorone diisocyanate. Another suitable silicone containing macromer is compound of formula X (in which x+y is a number in the range of 10 to 30) formed by the reaction of fluoroether, hydroxy-terminated polydimethylsiloxane, isophorone diisocyanate and isocyanatoethylmethacrylate.

Formula X

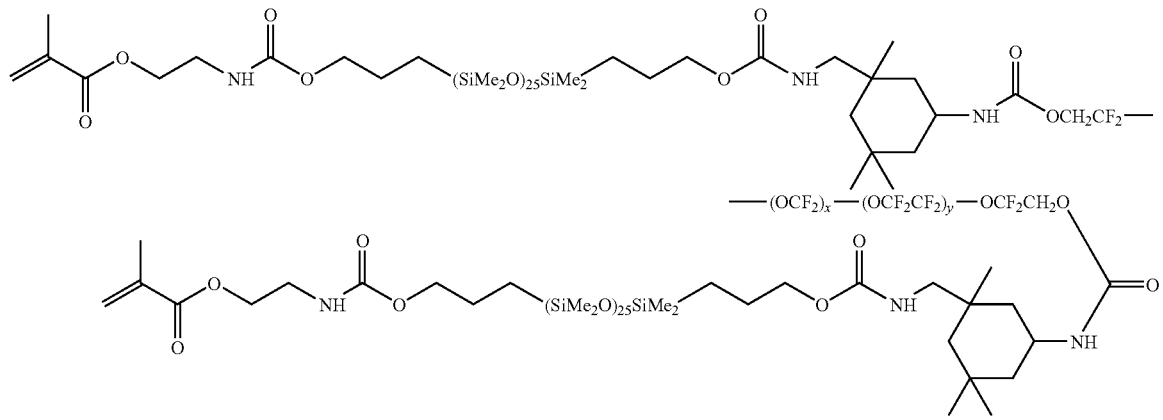

Other silicone containing components suitable for use in this invention include macromers containing polysiloxane, polyalkylene ether, diisocyanate, polyfluorinated hydrocarbon, polyfluorinated ether and polysaccharide groups; polysiloxanes with a polar fluorinated graft or side group having a hydrogen atom attached to a terminal difluoro-substituted carbon atom; hydrophilic siloxanyl methacrylates containing ether and siloxanyl linkanges and crosslinkable monomers containing polyether and polysiloxanyl groups. Any of the foregoing polysiloxanes can also be used as the silicone containing component in this invention.

Processes

The following method steps are provided as examples of processes that may be implemented according to some aspects of the present invention. It should be understood that the order in which the method steps are presented is not meant to be limiting and other orders may be used to implement the invention. In addition, not all of the steps are required to implement the present invention and additional steps may be included in various embodiments of the present invention.

Figure 4:
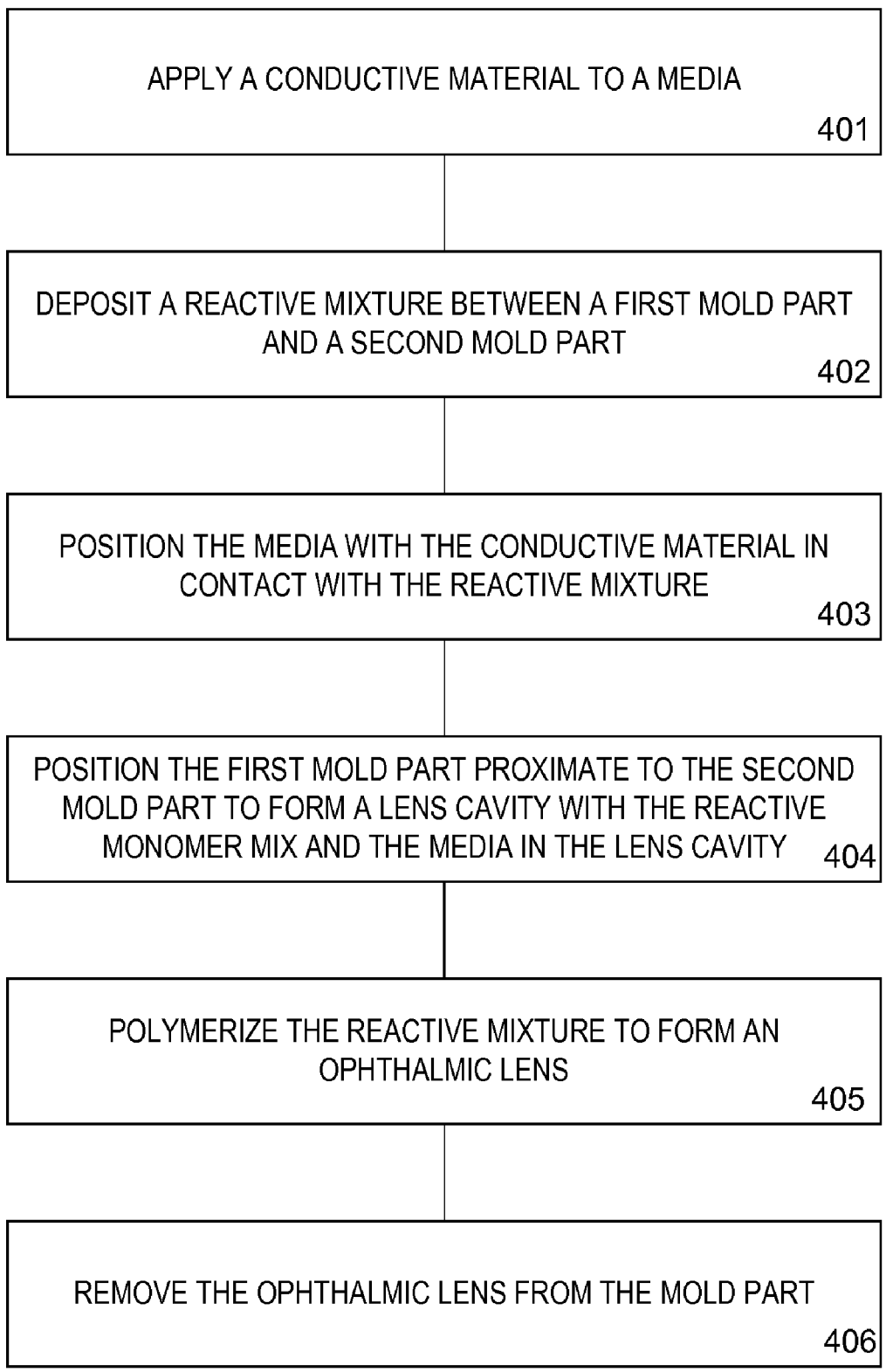
FIG. 4 illustrates method steps according to some embodiments of the present invention.

Referring now to FIG. 4, a flowchart illustrates exemplary steps that may be used to implement the present invention, at 401, a conductive material which can act as an energy receptor 109 is applied to a media. The media 111 may or may not also contain one or more of: a component 203, battery and capacitor or other energy storage device.

At 402, a reactive monomer mix can be deposited into a mold part 101-102.

At 403, the media 111 with the energy receptor 109 can be placed into the mold part 101-102. In some preferred embodiments, the media 111 is placed in the mold part 101-102 via mechanical placement. Mechanical placement can include, for example, a robot or other automation, such as those known in the industry to place surface mount components. Human placement of a media 111 with an energy receptor 109 is also within the scope of the present invention. Accordingly, any mechanical placement effective to place a media 111 with an energy receptor 109 within a cast mold part such that the polymerization of a Reactive Mixture 110 contained by the mold part will include the energy receptor 109 in a resultant ophthalmic lens.

In some embodiments, a binder layer 111 can be applied to a mold part 101-102 prior to placement of the energy receptor on the mold part 101-102. A binder layer 111 can include, by way of non-limiting example, a pigment or a monomer. The binding layer may be applied for example via an ink jetting or pad printing process. In some embodiments, a processor device, 203 may also be placed into the binder 109 in electrical contact with the ink jetted energy receptor 111.

At 404, the first mold part can be placed proximate to the second mold part to form a lens forming cavity with at least some of the reactive monomer mix and the energy receptor in the cavity. At 405, the reactive monomer mix within the cavity can be polymerized. Polymerization can be accomplished for example via exposure to one or both of actinic radiation and heat. At 406, the lens is removed from the mold parts.

In some embodiments, a binding layer can include a binding polymer that is capable of forming an interpenetrating polymer network with a lens material, the need for formation of covalent bonds between the binder and lens material to form a stable lens 110 is eliminated. Stability of a lens 110 with an energy receptor placed into the binder is provided by entrapment of the energy receptor 109 in the binding polymer and the lens base polymer. The binding polymers of the invention can include, for example, those made from a homopolymer or copolymer, or combinations thereof, having similar solubility parameters to each other and the binding polymer has similar solubility parameters to the lens material. Binding polymers may contain functional groups that render the polymers and copolymers of the binding polymer capable of interactions with each other. The functional groups can include groups of one polymer or copolymer interact with that of another in a manner that increases the density of the interactions helping to inhibit the mobility of and/or entrap the pigment particles. The interactions between the functional groups may be polar, dispersive, or of a charge transfer complex nature. The functional groups may be located on the polymer or copolymer backbones or be pendant from the backbones.

By way of non-limiting example, a monomer, or mixture of monomers, that form a polymer with a positive charge may be used in conjunction with a monomer or monomers that form a polymer with a negative charge to form the binding polymer. As a more specific example, methacrylic acid ("MA") and 2-hydroxyethylmethacrylate ("HEMA") may be used to provide a MAA/HEMA copolymer that is then mixed with a HEMA/3-(N, N-dimethyl) propyl acrylamide copolymer to form the binding polymer.

As another example, the binding polymer may be composed of hydrophobically-modified monomers including, without limitation, amides and esters of the formula:

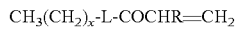

wherein L may be —NH or oxygen, x may be a whole number from 2 to 24, R may be a $C_1$ to $C_6$ alkyl or hydrogen and preferably is methyl or hydrogen. Examples of such amides and esters include, without limitation, lauryl methacrylamide, and hexyl methacrylate. As yet another example, polymers of aliphatic chain extended carbamates and ureas may be used to form the binding polymer.

Binding polymers suitable for a binding layer may also include a random block copolymer of HEMA, MAA and lauryl methacrylate ("LMA"), a random block copolymer of HEMA and MAA or HEMA and LMA, or a homopolymer of HEMA. The weight percentages, based on the total weight of the binding polymer, of each component in these embodiments is about 93 to about 100 weight percent HEMA, about 0 to about 2 weight percent MAA, and about 0 to about 5 weight percent LMA.

The molecular weight of the binding polymer can be such that it is somewhat soluble in the lens material and swells in it. The lens material diffuses into the binding polymer and is polymerized and/or cross-linked. However, at the same time, the molecular weight of the binding polymer cannot be so high as to impact the quality of the printed image. Preferably, the molecular weight of the binding polymer is about 7,000 to about 100,000, more preferably about 7,000 to about 40,000, most preferably about 17,000 to about 35,000 $M_{peak}$ which corresponds to the molecular weight of the highest peak in the SEC analyses ($=(M_n \times M_w)^{1/2}$)

For purposes of the invention, the molecular weight can be determined using a gel permeation chromatograph with a 90° light scattering and refractive index detectors. Two columns of PW4000 and PW2500, a methanol-water eluent of 75/25 wt/wt adjusted to 50 mM sodium chloride and a mixture of polyethylene glycol and polyethylene oxide molecules with well defined molecular weights ranging from 325,000 to 194 are used.

One ordinarily skilled in the art will recognize that, by using chain transfer agents in the production of the binding polymer, by using large amounts of initiator, by using living polymerization, by selection of appropriate monomer and initiator concentrations, by selection of amounts and types of solvent, or combinations thereof, the desired binding polymer molecular weight may be obtained. Preferably, a chain transfer agent is used in conjunction with an initiator, or more preferably with an initiator and one or more solvents to achieve the desired molecular weight. Alternatively, small amounts of very high molecular weight binding polymer may be used in conjunction with large amounts of solvent to maintain a desired viscosity for the binding polymer. Preferably, the viscosity of the binding polymer will be about 4,000 to about 15,000 centipoise at 23° C.

Chain transfer agents useful in forming the binding polymers used in the invention have chain transfer constants values of greater than about 0.01, preferably greater than about 7, and more preferably greater than about 25,000.

Any desirable initiators may be used including, without limitation, ultra-violet, visible light, thermal initiators and the like and combinations thereof Preferably, a thermal initiator is used, more preferably 2,2-azobis isobutyronitrile and 2,2-azobis 2-methylbutyronitrile. The amount of initiator used will be about 0.1 to about 5 weight percent based on the total weight of the formulation. Preferably, 2,2-azobis 2-methylbutyronitrile is used with dodecanethiol.

A binding polymer layer or other media 111 may be made by any convenient polymerization process including, without limitation, radical chain polymerization, step polymerization, emulsion polymerization, ionic chain polymerization, ring opening, group transfer polymerization, atom transfer polymerization, and the like. Preferably, a thermal-initiated, free-radical polymerization is used. Conditions for carrying out the polymerization are within the knowledge of one ordinarily skilled in the art.

Solvents useful in the production of the binding polymer are medium boiling solvents having boiling points between about 120 and 230° C. Selection of the solvent to be used will be based on the type of binding polymer to be produced and its molecular weight. Suitable solvents include, without limitation, diacetone alcohol, cyclohexanone, isopropyl lactate, 3-methoxy 1-butanol, 1-ethoxy-2-propanol, and the like.

In some embodiments, a binding polymer layer 111 of the invention may be tailored, in terms of expansion factor in water, to the lens material with which it will be used. Matching, or substantially matching, the expansion factor of the binding polymer with that of the cured lens material in packing solution may facilitate the avoidance of development of stresses within the lens that result in poor optics and lens parameter shifts. Additionally, the binding polymer can be swellable in the lens material, permitting swelling of the image printed using the colorant of the invention. Due to this swelling, the image becomes entrapped within the lens material without any impact on lens comfort.

In some embodiments, colorants may be included in the binding layer. Pigments useful with the binding polymer in the colorants of the invention are those organic or inorganic pigments suitable for use in contact lenses, or combinations of such pigments. The opacity may be controlled by varying the concentration of the pigment and opacifying agent used, with higher amounts yielding greater opacity. Illustrative organic pigments include, without limitation, pthalocyanine blue, pthalocyanine green, carbazole violet, vat orange #1, and the like and combinations thereof. Examples of useful inorganic pigments include, without limitation, iron oxide black, iron oxide brown, iron oxide yellow, iron oxide red, titanium dioxide, and the like, and combinations thereof. In addition to these pigments, soluble and non-soluble dyes may be used including, without limitation, dichlorotriazine and vinyl sulfone-based dyes. Useful dyes and pigments are commercially available.

Coating, or wetting, of the pigment particles with binding polymer provides better dispersion of the pigment particles in the bulk binding polymer. The coating may be achieved by use of electrostatic, dispersive, or hydrogen bonding forces to cover the pigment's surface. Preferably, a high shear force is used to disperse the pigment into the binding polymer. The pigment may be added to the binding polymer by dispensing the polymer and pigment into a suitable mixer, such as a rotary shaft mixer and mixing until a homogeneous mixture results, typically for a period of up to about 30 minutes. The mixture may be then fed into a high shear mill, such as an Eiger mill to disperse the pigment into the binding polymer. Repeated milling is carried out as necessary to achieve complete dispersion. Generally, milling is carried out until the pigments are about 0.2 to about 3 microns in size. Milling may be carried out using any suitable, commercially available device including, without limitation, a high shear or ball milling device.

In addition to the pigment and binding polymer, in some embodiments, the binding layer contains one or more solvents that aid in coating of the binding layer onto the mold part 101-102. It is another discovery of the invention that, to facilitate a binding layer that does not bleed or run on the mold part 101-102 surface to which it is applied, it is desirable, and preferred, that the binding layer 101-102 have a surface tension below about 27 mN/m. This surface tension may be achieved by treatment of the surface, for example a mold surface, to which the binding layer will be applied. Surface treatments may be effected by methods known in the art, such as, but not limited to plasma and corona treatments. Alternatively, and preferably, the desired surface tension may be achieved by the choice of solvents used in the colorant.

Accordingly, exemplary solvents useful in the binding layer include those solvents that are capable of increasing or decreasing the viscosity of the binding layer and aiding in controlling the surface tension. Suitable solvents include, without limitation, cyclopentanones, 4-methyl-2-pentanone, 1-methoxy-2-propanol, 1-ethoxy-2-propanol, isopropyl lactate and the like and combinations thereof. Preferably, 1-ethoxy-2-propanol and isopropyl lactate are used.

In some preferred embodiments, at least three different solvents are used in the binding layer material of the invention. The first two of these solvents, both medium boiling point solvents, are used in the production of the binding polymer. Although these solvents may be stripped from the binding polymer after its formation, it is preferred that they are retained. Preferably, the two solvents are 1-ethoxy-2-propanol and isopropyl lactate. An additional low boiling solvent, meaning a solvent the boiling point of which is between about 75 and about 120° C., can be used to decrease the viscosity of the colorant as desired. Suitable low boiling solvents include, without limitation, 2-propanol, 1-methoxy-2-propanol, 1-propanol, and the like and combinations thereof. Preferably, 1-propanol is used.

The specific amount of solvents used can depend on a number of factors. For example, the amount of solvents used in forming the binding polymer will depend upon the molecular weight of the binding polymer desired and the constituents, such as the monomers and copolymers, used in the binding polymer. The amount of low boiling solvent used will depend upon the viscosity and surface tension desired for the colorant. Further, if the colorant is to be applied to a mold and cured with a lens material, the amount of solvent used will depend upon the lens and mold materials used and whether the mold material has undergone any surface treatment to increase its wettability. Determination of the precise amount of solvent to be used is within the skill of one ordinarily skilled in the art. Generally, the total weight of the solvents used will be about 40 to about 75 weight percent of solvent will be used.

In addition to the solvents, a plasticizer may be and, preferably is, added to the binding layer to reduce cracking during the drying of the binding layer and to enhance the diffusion and swelling of the binding layer by the lens material. The type and amount of plasticizer used will depend on the molecular weight of the binding polymer used and, for colorants placed onto molds that are stored prior to use, the shelf-life stability desired. Useful plasticizers include, without limitation, glycerol, propylene glycol, dipropylene glycol, tripropylene glycol, polyethylene glycol 200, 400, or 600, and the like and combinations thereof. Preferably, glycerol is used. Amounts of plasticizer used generally will be 0 to about 10 weight percent based on the weight of the colorant.

One ordinarily skilled in the art will recognize that additives other than those discussed also may be included in the binding layer composition of the invention. Suitable additives include, without limitation, additives that aid flow and leveling, additives for foam prevention, additives for rheology modification, and the like, and combinations thereof.

In some embodiments of the present invention, the binding layer becomes embedded in the lens material upon curing of the lens material. Thus, the binding layer may embed closer to the front or back surface of the lens formed depending on the surface of the mold to which the lens the binding layer 11 is applied. Additionally, one or more layers of binding layer 11 may be applied in any order.

Although invention may be used to provide hard or soft contact lenses made of any known lens material, or material suitable for manufacturing such lenses, preferably, the lenses of the invention are soft contact lenses having water contents of about 0 to about 90 percent. More preferably, the lenses are made of monomers containing hydroxy groups, carboxyl groups, or both or be made from silicone-containing polymers, such as siloxanes, hydrogels, silicone hydrogels, and combinations thereof. Material useful for forming the lenses of the invention may be made by reacting blends of macromers, monomers, and combinations thereof along with additives such as polymerization initiators. Suitable materials include, without limitation, silicone hydrogels made from silicone macromers and hydrophilic monomers.

Referring now again to FIG. 4, at 403, the media 111 is positioned with the reactive mixture in between a first mold part and a second mold part with the media 111 in contact with the reactive mixture 110.

At 404, a first mold part 101 is placed proximate to the second mold part 102 to form a lens cavity with the Reactive Monomer mix 110 and the media insert 111 in the lens cavity. At 405, the reactive mixture is polymerized, such as for example via exposure to one or both of actinic radiation and heat. At 406, an ophthalmic device 201 incorporating the energy receptor 109 is removed from the mold parts 101-102 used to form an ophthalmic lens 202.

Referring now to FIG. 5 in another aspect of the present invention, a component 203 incorporated into an ophthalmic device 201 can be powered via wirelessly transmitted energy. At 501, wireless energy is transmitted to an energy receptor included with a media and incorporated into an ophthalmic lens, such as an ophthalmic lens. In some embodiments, the energy can be transmitted at a frequency tuned to an energy receptor 111 included in an ophthalmic lens 201. At 502, energy is received into the energy receptor included in the ophthalmic lens. In some embodiments, the energy receptor 111 can store the energy as an electrical charge.

At 503, the energy received is directed into the information component 203. The energy can be directed, for example, via electrical circuitry capable of conducting the electrical charge. At 504 the component 203 performs some action on information. The action can include one or more of: receiving, transmitting, storing and manipulating information. Preferred embodiments will include the information being processed and stored as digital values.

At 505, in some embodiments, information can be transmitted from the processing device. Some embodiments can also include the transmission of information based upon the action performed upon the information.

Apparatus

Figure 3:
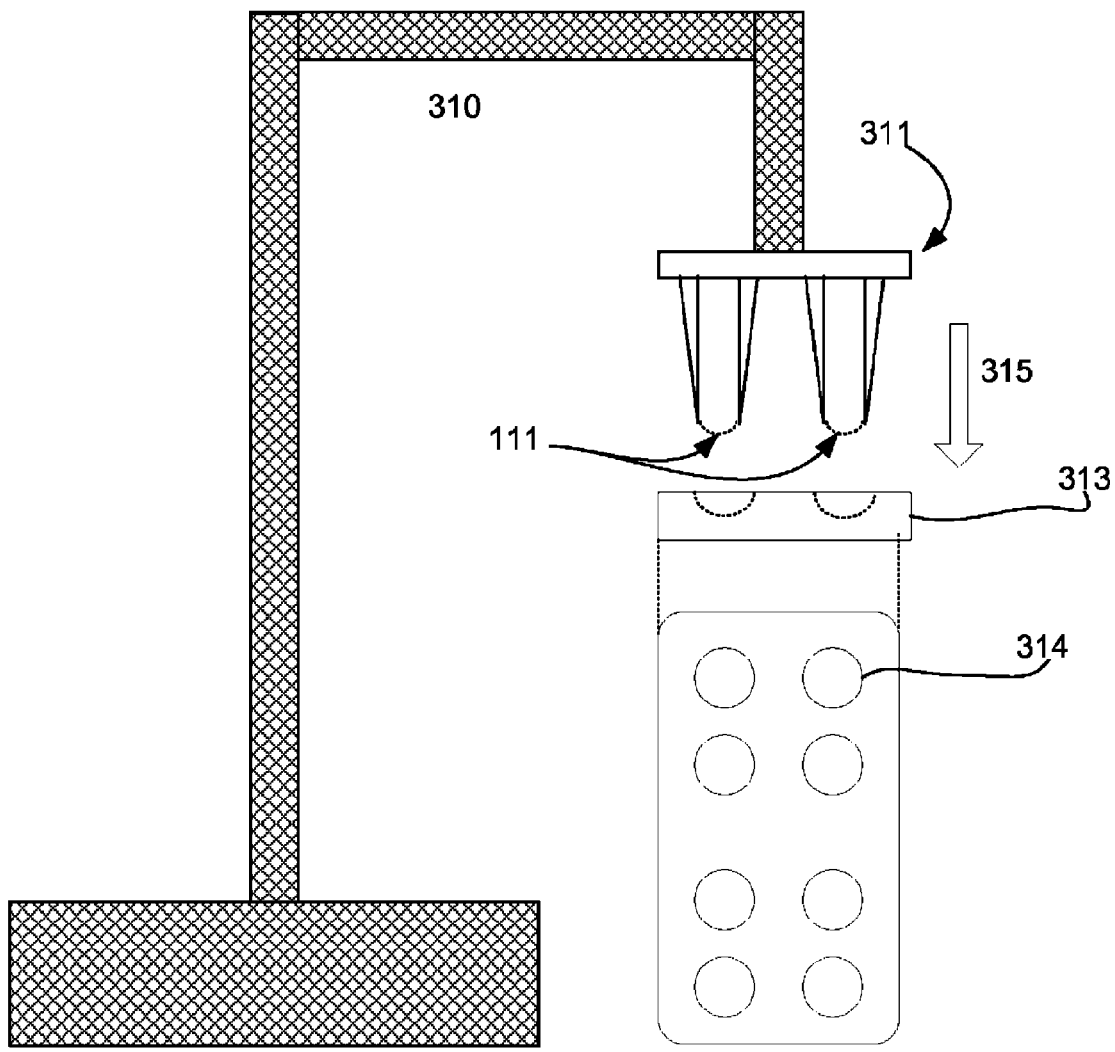
FIG. 3 illustrates an apparatus utilized to place a media with an energy receptor in a lens mold.

Referring now to FIG. 3, an automation apparatus 310 is illustrated with one or more media handling devices 311. As illustrated, multiple mold parts, each with an associated media 314 can be contained on a pallet 313 and presented to an ink jetting nozzle 311. Embodiments, can include a media handling device 311 individually placing energy receptors 109 in respective media 314, or multiple media handling devices 311 simultaneously placing media with energy receptors respective mold parts 314.

Figure 6:
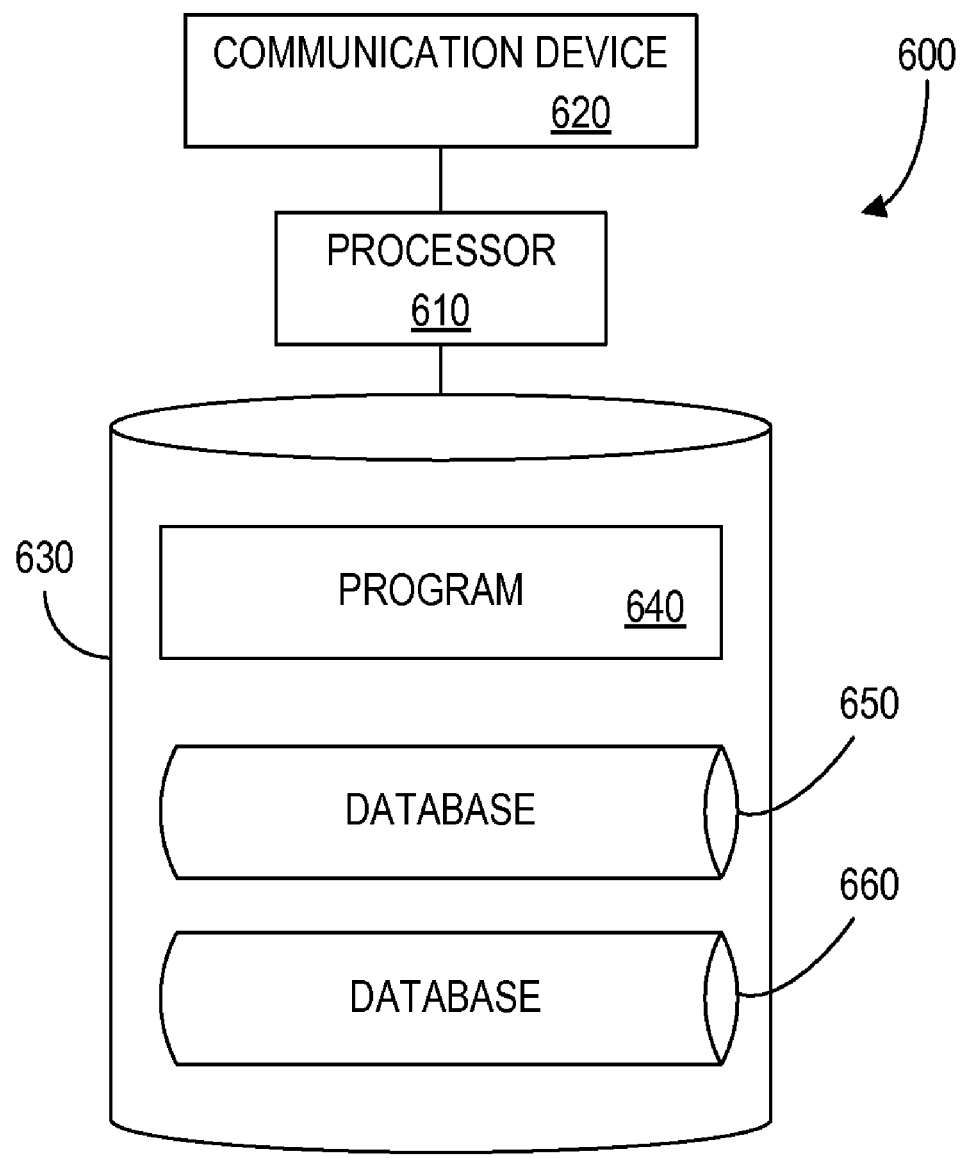
FIG. 6 illustrates a processor that may be used to implement some embodiments of the present invention.

Referring now to FIG. 6 a controller 600 is illustrated that may be used in some embodiments of the present invention. The controller 603 includes a processor 610, which may include one or more processor components coupled to a communication device 620. In some embodiments, a controller 600 can be used to transmit energy to the energy receptor placed in the ophthalmic lens.

The controller can include a one or more processors, coupled to a communication device configured to communicate energy via a communication channel. The communication device may be used to electronically control one or more of: the transfer of energy to the ophthalmic lens receptor and the transfer of digital data to and from an ophthalmic lens.

The communication device 620 may be used to communicate, for example, with one or more controller apparatus or manufacturing equipment components, such as for example ink jet printing apparatus for ink jetting conductive material.

The processor 610 is also in communication with a storage device 630. The storage device 630 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 630 can store a program 616 for controlling the processor 610. The processor 610 performs instructions of the program 616, and thereby operates in accordance with the present invention. For example, the processor 610 may receive information descriptive of media placement, processing device placement, and the like. The storage device 630 can also store ophthalmic related data in one or more databases. The database may include customized energy receptor designs, metrology data, and specific control sequences for ink jetting conductive material to form an energy receptor.

In some embodiments, an ophthalmic lens with a component, such as processor device can be matched with a wireless energy source located on the person in such form factors as jewelry, shirt collar, hat, or into a pair of glasses.

CONCLUSION

The present invention, as described above and as further defined by the claims below, provides methods of processing ophthalmic lenses and apparatus for implementing such methods, as well as ophthalmic lenses formed thereby.

The invention claimed is:

1. A method of forming an ophthalmic lens, the method comprising:
    depositing a conductive material capable of receiving energy via a radio wave on to a media;
    depositing a reactive monomer mix into a first mold part;
    positioning the media with the conductive material in contact with the reactive monomer mix;
    positioning the first mold part proximate to a second mold part thereby forming a lens cavity with the media and conductive material and at least some of reactive monomer mix in the lens cavity; and
    exposing the reactive monomer mix to actinic radiation.

2. The method of claim 1 wherein the conductive material capable of receiving energy via a radio wave is deposited on to the media via ink jetting.

3. The method of claim 2 wherein the media comprises a binder layer and the method additionally comprises the steps of:
    depositing the binder layer onto one of the first mold part and the second mold part; and
    ink jetting the conductive material onto the binder layer.

4. The method of claim 1 wherein the media is in contact with one or both of the first mold part and the second mold part.

5. The method of claim 2 wherein the conductive material is ink jetted in a pattern proximate to a circumference of the ophthalmic lens and outside of a field of vision when the ophthalmic lens is placed on an eye.

6. The method of claim 1 wherein an energy receptor comprising the conductive material capable of receiving energy via a radio wave comprises conductive fibers.

7. The method of claim 6 wherein the conductive fibers comprise carbon nanotubes.

8. The method of claim 7 wherein the conductive fibers comprise nanostructures.

9. The method of claim 7 wherein the binder layer comprises a pigment.

10. The method of claim 3 wherein the binder layer comprises a prepolymer.

11. The method of claim 3 wherein the binder layer comprises reactive monomer mix.

* * * * *